(12) United States Patent
Wentworth et al.

(10) Patent No.: US 9,328,760 B2
(45) Date of Patent: May 3, 2016

(54) QUICK CONNECT RODS

(71) Applicant: Earth Tool Company LLC, Oconomowoc, WI (US)

(72) Inventors: Steven W. Wentworth, Fountain Hills, AZ (US); Robert F. Crane, Oconomowoc, WI (US)

(73) Assignee: Earth Tool Company LLC, Lake Mills, WI (US)

( * ) Notice: Subject to any disclaimer, the term of this patent is extended or adjusted under 35 U.S.C. 154(b) by 401 days.

(21) Appl. No.: 13/920,822

(22) Filed: Jun. 18, 2013

(65) Prior Publication Data

US 2013/0343814 A1    Dec. 26, 2013

Related U.S. Application Data

(60) Provisional application No. 61/662,107, filed on Jun. 20, 2012, provisional application No. 61/725,325, filed on Nov. 12, 2012.

(51) Int. Cl.
*F16B 12/00* (2006.01)
*F16B 21/04* (2006.01)
*E21B 17/046* (2006.01)

(52) U.S. Cl.
CPC ............... *F16B 21/04* (2013.01); *E21B 17/046* (2013.01); *Y10T 403/7007* (2015.01)

(58) Field of Classification Search
CPC ..... E21B 17/043; E21B 17/04; E21B 17/046; Y10T 403/591; Y10T 403/593; Y10T 403/599; Y10T 403/602; Y10T 403/604; Y10T 403/606; Y10T 403/7005; Y10T 403/7009
See application file for complete search history.

(56) References Cited

U.S. PATENT DOCUMENTS 1,526,565 A * 2/1925 Redmond ............. E21B 17/046
 279/22
4,408,927 A * 10/1983 Fraiberg ................ E21B 17/043
 285/92

(Continued)

FOREIGN PATENT DOCUMENTS

CA         2559469 A1 *  3/2007  ............ E21B 17/042

*Primary Examiner* — Daniel P Stodola
*Assistant Examiner* — Jonathan Masinick
(74) *Attorney, Agent, or Firm* — Tomlinson Rust McKinstry Grable (57) ABSTRACT

The present invention is directed to a rod string with a plurality of rod sections and a method for making up and breaking out the rod sections. The rod sections have corresponding pin and box ends, each having grooves and lands and an ungrooved portion. The rod sections can be connected by inserting the pin end into a box end and turning less than a full turn. A lock engagement mechanism having a first end and a second end is provided inside the rod sections and locks when the pin end is rotated into place. The lock engagement mechanism has a rotation stop which protrudes proximate the first end to prevent relative rotation of two rod sections until a key manipulates the lock engagement mechanism to retract the rotation stop.

8 Claims, 7 Drawing Sheets

(56) References Cited

U.S. PATENT DOCUMENTS

| | | | |
|---|---|---|---|
| 4,659,119 A * | 4/1987 | Reimert | F16L 15/003 285/318 |
| 4,991,249 A * | 2/1991 | Suroff | A46B 15/0002 15/176.2 |
| 5,407,293 A * | 4/1995 | Crainich | A61B 17/29 403/322.1 |
| 5,947,214 A * | 9/1999 | Tibbitts | E21B 17/04 175/276 |
| 6,311,790 B1 * | 11/2001 | Beckwith | E21B 7/064 175/320 |
| 6,364,036 B1 | 4/2002 | Puttmann | |
| 6,460,900 B1 * | 10/2002 | Bakke | E21B 17/046 285/330 |
| 8,690,200 B1 * | 4/2014 | Patterson, Jr. | E21B 17/08 285/403 |
| 2007/0189847 A1 * | 8/2007 | Lee | B25B 23/0035 403/322.1 |
| 2010/0054854 A1 * | 3/2010 | Wang | B25B 15/001 403/322.2 |
| 2012/0012301 A1 * | 1/2012 | Hughes | E21B 17/028 166/65.1 |
| 2015/0096764 A1 * | 4/2015 | Magnuson | E21B 17/046 166/380 |

* cited by examiner

QUICK CONNECT RODS

CROSS REFERENCE TO RELATED APPLICATION

This application claims the benefit of provisional patent application Ser. No. 61/662,107 filed on Jun. 20, 2012, and provisional patent application Ser. No. 61/725,325 filed on Nov. 12, 2012, the entire contents of which are incorporated herein by reference.

FIELD OF THE INVENTION

The present invention relates generally to rod sections for use with a multi-section drill string in underground boring applications.

SUMMARY OF THE INVENTION

The invention is directed to a rod string comprising a plurality of rod sections. Each of the plurality of rod sections comprises a body, a pin end, a box end, and a lock engagement mechanism. The body has a first and a second end. The pin end comprises a plurality of grooves and lands at the first end of the body. The box end comprises a plurality of grooves and lands corresponding to the grooves and lands of the pin end at the second end of the body. The lock engagement mechanism is disposed within the body and moveable to a locked position when the pin end is placed within the box end of an adjacent rod section.

In another embodiment the invention is directed to a lock engagement mechanism for a rod section. The lock engagement mechanism is moveable between a first position and a second position. The rod section comprises a pin end and a box end. The lock engagement mechanism comprises a body located within the rod section, a rotation stop, and a spring mechanism. The rotation stop is located proximate the pin end and protrudes from the pin end when the lock engagement mechanism is in the second position. The spring mechanism biases the lock engagement mechanism in the second position.

In another embodiment, the invention is directed to a method for making up a rod string. The rod string comprises a plurality of rod sections each comprising a box end, a pin end, and a lock engagement mechanism. The method comprises advancing the pin end of a first rod section into a box end of a second rod section, rotating the first rod section less than a full turn, advancing a rotation stop into the box end of the second rod section, and contacting the lock engagement mechanism of the first rod section with the box end of the second rod section such that the first rod section is rotationally locked with the second rod section.

DESCRIPTION OF THE PREFERRED EMBODIMENT

Devices such as horizontal directional drills (HDD), rod pusher/pullers and static pipe bursting machines all utilize a rod string that spans the length of new pipe or conduit to be installed. In the case of directional drills, the torsional load of rotating a cutting tool is often the cause of the greatest stress on the rod string. For this reason, directional drill rigs generally use threaded together rod sections. However, the threaded rod sections must have a device with sufficient mechanical overhead to produce enough torque to make or break the threaded connection.

Figure 1:
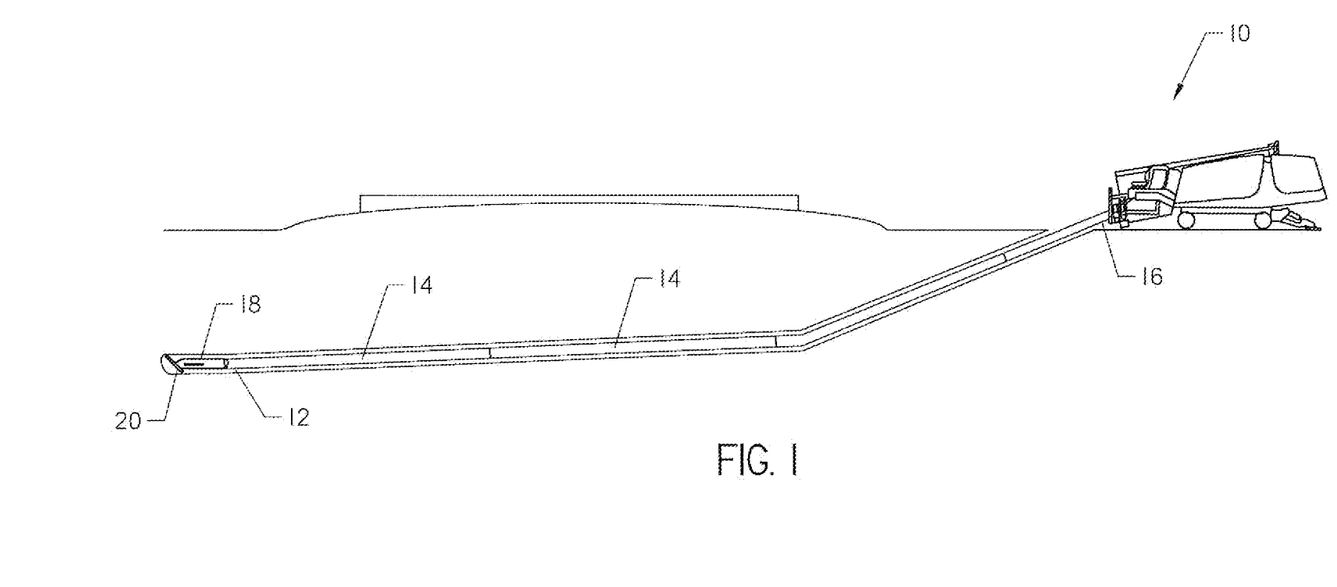
FIG. 1 is an illustration of a horizontal directional drilling machine for use with the present invention.

With reference now to the figures in general and FIG. 1 in particular, shown therein is a horizontal directional drilling (HDD) machine 10 adapted to provide thrust and rotation to a rod string 12 made up of a plurality of individual rod sections 14. HDD is shown for purposes of illustration. The rod sections 14 of this invention could be a pit launched machine, pipe pusher, or pipe puller. The rod string 12 is operatively connected to the HDD machine 10 at a first end 16. A second end 18 of the rod string 12 comprises a boring tool 20 for underground boring purposes.

Figure 2:
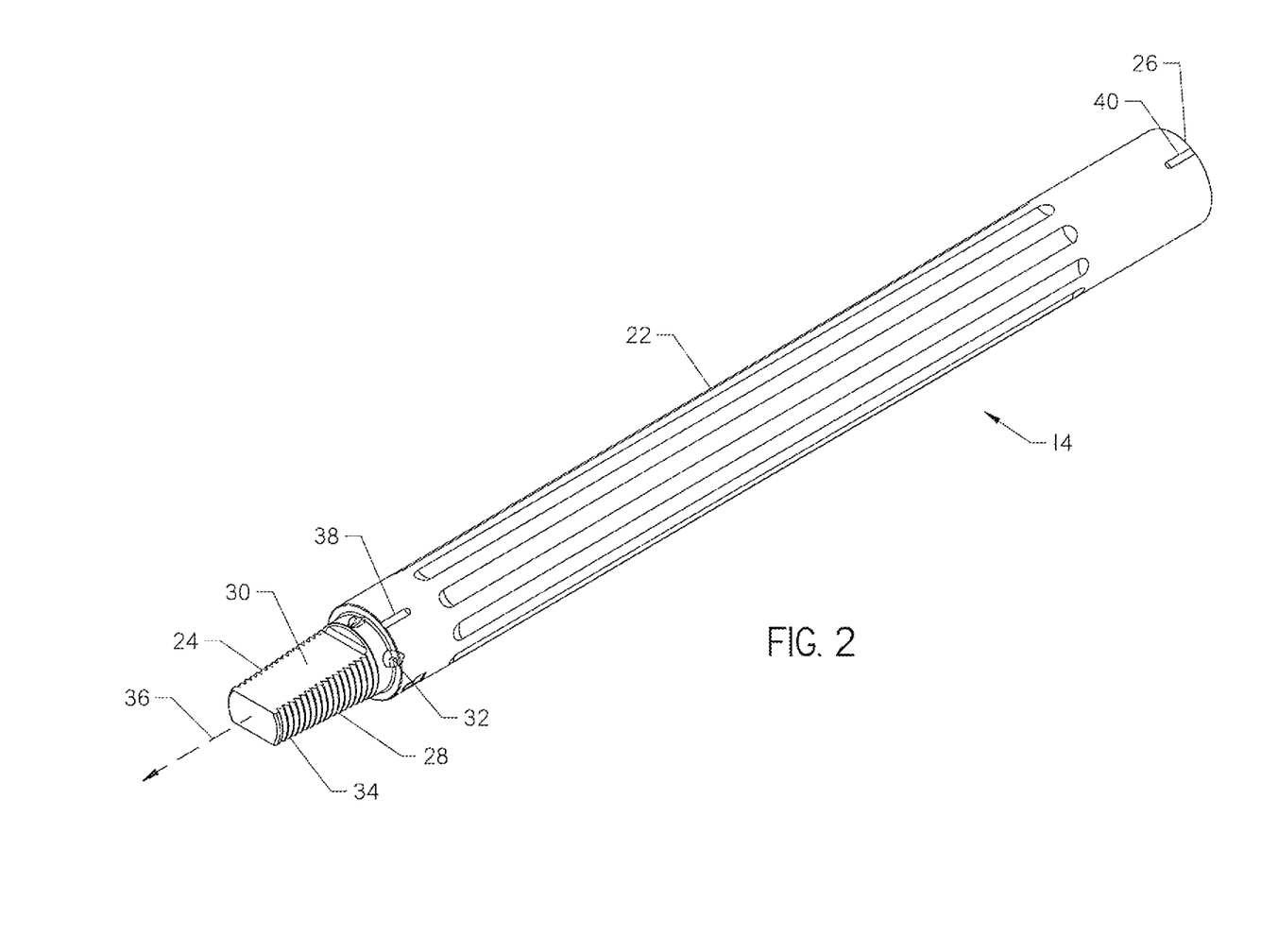
FIG. 2 is a perspective view of a rod section for use with the present invention.

With reference to FIG. 2, a first rod section 14 is shown in more detail. The rod section comprises a body 22, a first end, or pin end 24 located at one end of the body, and a second end, or box end 26 located at an opposite end of the body. The pin end 24 comprises a grooved portion 28, an ungrooved portion 30, and a static rotation stop 32. Preferably, the grooved portion 28 comprises a plurality of grooves and lands 34 comprising arcs having a common radius about a centerline 36 of the rod section 14. The ungrooved portion 30 has no grooves and lands 34 and is preferably disposed closer to the centerline 36 than the grooved portion 28. As shown, the ungrooved portion 30 allows the pin end 24 to have a greater width than height. As shown, the ungrooved portion 30 and grooved portion 28 of the pin end are discontinuous, providing two ungrooved portions and two grooved portions.

The static rotation stop 32 is located against the body 22 of the rod section 14 and interacts with the box end 26 of an adjacent rod section as will be discussed in more detail below. A pin end alignment groove 38 is located on the body 22 proximate the pin end 24. A box end alignment groove 40 is located on the body 22 proximate the box end 26.

Figure 3:
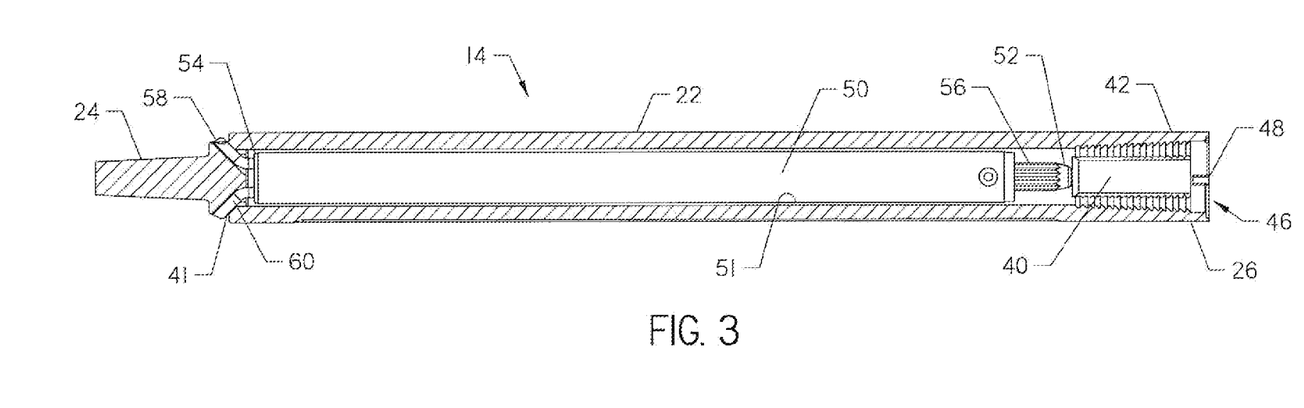
FIG. 3 is a cross-sectional view of the rod section of FIG. 2 with an internally disposed lock engagement mechanism shown without cross-section.
Figure 7:
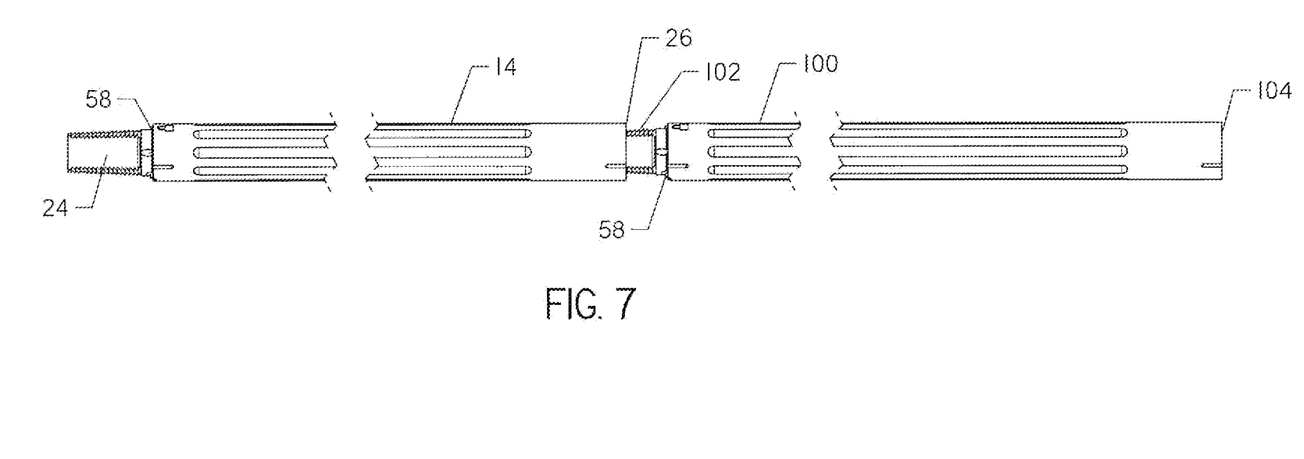
FIG. 7 is a side view of two rod sections being connected.

With reference now to FIG. 3, the first rod section 14 is shown in cross section. As shown, the pin end 24 comprises openings 41. The box end 26 is shown in further detail. The box end 26 comprises a counterbore of the pin end 24. The box end 26 thus comprises a grooved portion 42 comprising grooves and lands corresponding to the grooved portion 28 (FIG. 2) of a pin end of an adjacent, similarly formed rod section (FIG. 7). The box end 26 (shown in greater detail in FIG. 4) further comprises an opening 46 sized to fit the pin end 24 of an adjacent rod section. The box end 26 comprises a shoulder 48 to interact with the static rotation stop 32 (FIG. 2) of the pin end 24 of an adjacent rod section and a lock engagement stop 49 to interact with a lock engagement mechanism 50 of an adjacent rod section as described below. The shoulder 48 preferably engages the static rotation stop 32 (FIG. 2) when the grooved portion 42 of the box end is fully engaged with the grooved portion 28 of the pin end 24 of an adjacent, similarly formed rod section. The box end alignment groove 40 and the pin end alignment groove 38 (FIG. 2) of an adjacent rod section align when the rod section 14 and adjacent rod section are fully engaged.

Referring again to FIG. 3, the rod section 14 further comprises a lock engagement mechanism 50 located within a hollow section 51 of the body 22. The lock engagement mechanism 50 comprises a spring mechanism (not shown), a first end 52 located proximate the box end 26 of the rod section 14 and a second end 54 located proximate the pin end 24 of the rod section. The first end 52 comprises a rod removal drive 56. The second end 54 comprises a moveable rotation stop, or engagement point 58 located at the end of spring rods 60. The engagement point extends through the openings 41. The lock engagement mechanism 50 is rotatably moveable between a first, or locked position and a second, or unlocked position as will be described with reference to FIGS. 5A and 5B. As shown in FIG. 3, the engagement point 58 extends beyond the pin end 24 of the rod section 14 and thus the lock engagement mechanism 50 is in a locked position.

Figure 4:
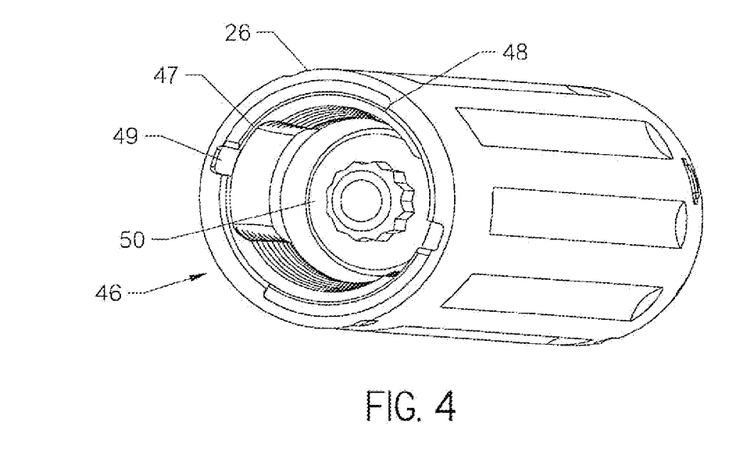
FIG. 4 is an end view of the box end of the rod section of FIG. 2.

With reference now to FIG. 4, the box end 26 is shown in greater detail. The pin end 24 (FIG. 2) of an adjacent rod section is placed within the opening 46 of the box end 26 such that the engagement point 58 (FIG. 3) is depressed against a wall 47 of the opening 46. The adjacent rod section is then rotated until the static rotation stop 32 (FIG. 2) interacts with the shoulder 48. In the embodiment of FIG. 4 the rod is rotated clockwise, though counterclockwise rotation may be utilized if desired. The engagement point 58 (FIG. 3) then reaches the lock engagement stop 49 of the box end 26, causing the engagement point 58 to extend into place and rotationally lock the rod section 14 and the adjacent rod section.

Figure 5A:
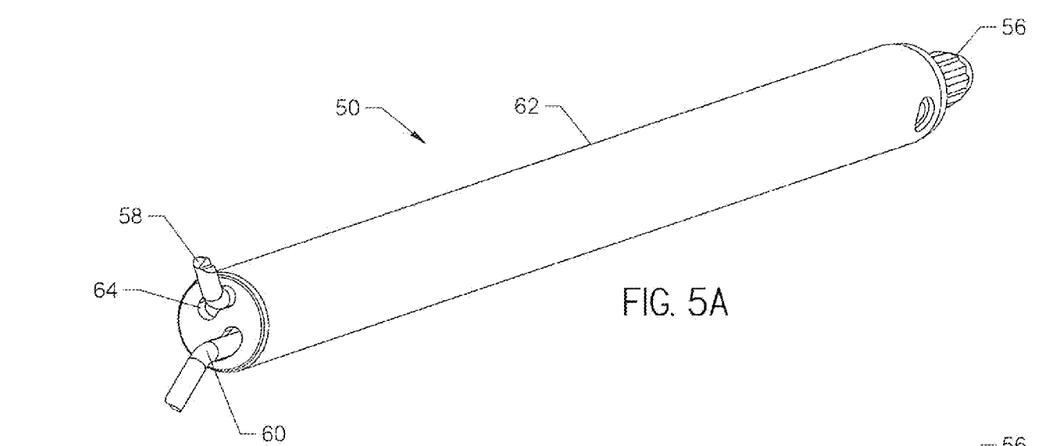
FIG. 5A is a perspective view of the lock engagement mechanism of FIG. 3 in a locked position.
Figure 5B:
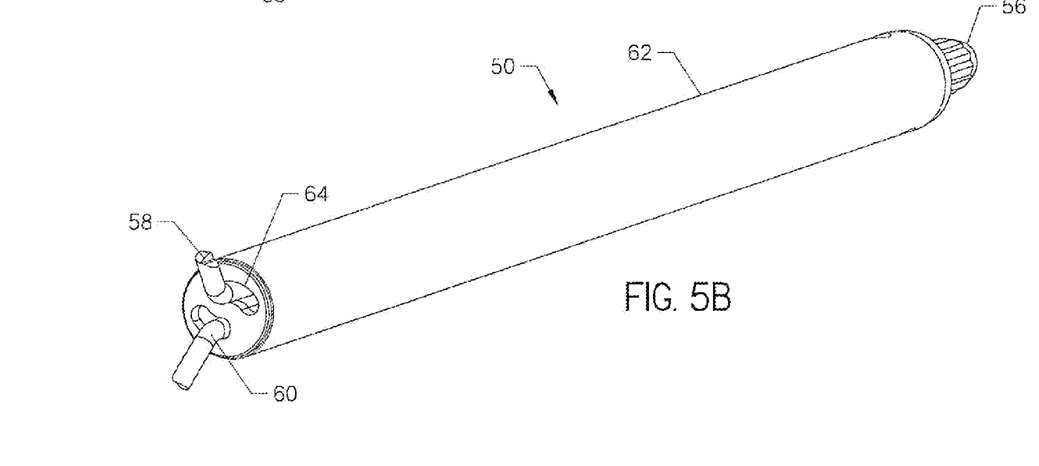
FIG. 5B is a perspective view of the lock engagement mechanism of FIG. 3 in an unlocked position.

With reference now to FIGS. 5A and 5B, the lock engagement mechanism 50 is shown in further detail. In FIG. 5A the lock engagement mechanism 50 is shown in the locked position. The lock engagement mechanism further comprises a cartridge 62 and a cam 64. The cartridge 62 houses the spring rods 60. In the locked position, the cam 64 profile allows the engagement points to flex when contacting the wall of the opening 48 as described with reference to FIG. 4 above. However, the spring rods 60 are biased to the locked position, so that the engagement points 58 will fully extend when the rod section 14 (FIG. 3) is rotated such that the engagement points 58 are next to the lock engagement stop 49 (FIG. 3).

With reference to FIG. 5B, the lock engagement mechanism 50 is shown in the unlocked position. Rotation of the rod removal drive 56 causes the cartridge 62 to rotate relative to the spring rods 60. Rotation of the cartridge 62 relative to the spring rods 60 moves the spring rods within the earns 64 such that the spring rods are closer to a centerline of the lock engagement mechanism 50. The engagement points 58 thus retreat from the lock engagement stop 49 (FIG. 4) and allow the rod section 14 to rotate relative to an adjacent rod section.

Figure 6:
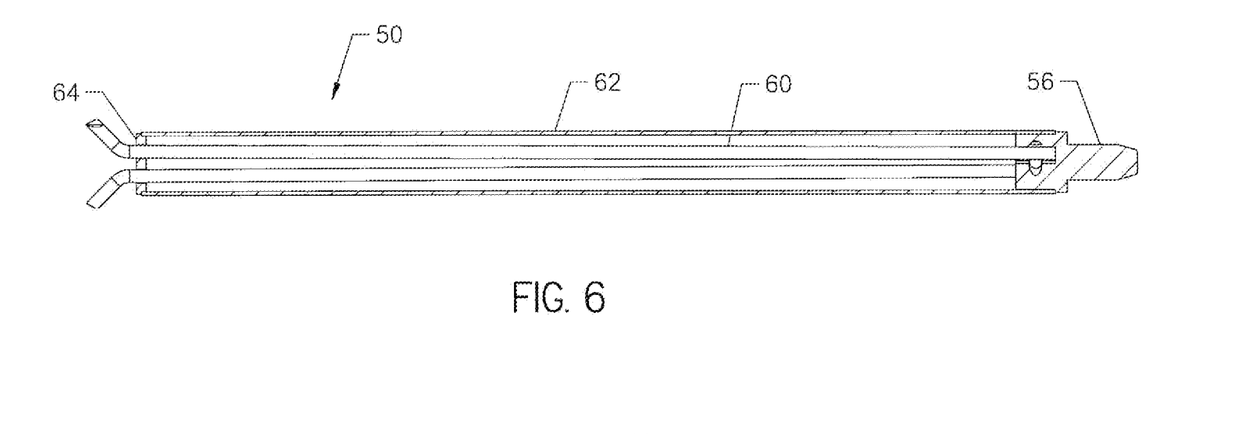
FIG. 6 is a cross-sectional side view of the lock engagement mechanism of FIG. 3.

With reference to FIG. 6, the lock engagement mechanism 50 is shown in section, with spring rods 60 extending within the cartridge 62. The spring rods 60 are rotationally locked to the rod removal drive 56 and not the cartridge 62, allowing the rod removal drive to adjust the relative position of the spring rods 60 within the cams 64.

With reference now to FIG. 7, a second rod section 100 comprising a second pin end 102 and second box end 104 is shown. The second pin end 102 of the second rod section 100 is shown entering the box end 26 of the rod section 14. Biased to the locked position, the engagement point 58 (FIG. 3) extends from the pin end 24, 102 of the rod section 14, 100. Thus, the engagement point 58 will contact the opening (FIG. 4) of box end 26 until rotated into position such that the engagement point 58 of pin end 102 is within lock engagement stop 49 (FIG. 4) of the box end 26.

Figure 8:
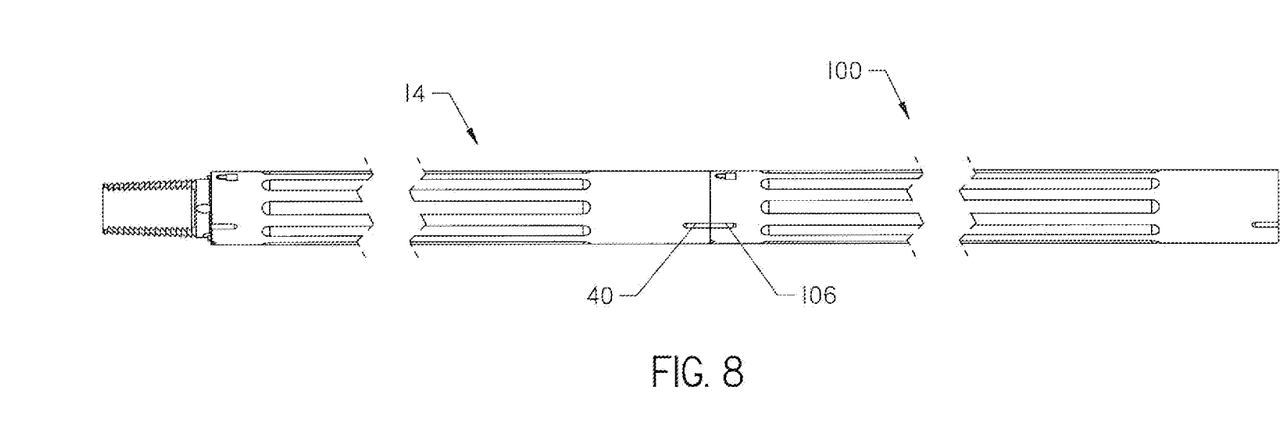
FIG. 8 is a side view of two rod sections connected but not locked.

With reference now to FIG. 8, the rod sections 14, 100 of the present invention are oriented such that the box end alignment groove 40 of the first rod section 14 is aligned with a pin end alignment groove 106 of the second rod section 100. The pin end 102 of the second rod section 100 is advanced without rotation into the box end 26 of the first rod section 14. In this orientation, the engagement points 58 of the lock engagement mechanism 50 of rod section 100 contact an inner wall of the box end 26.

Figure 9:
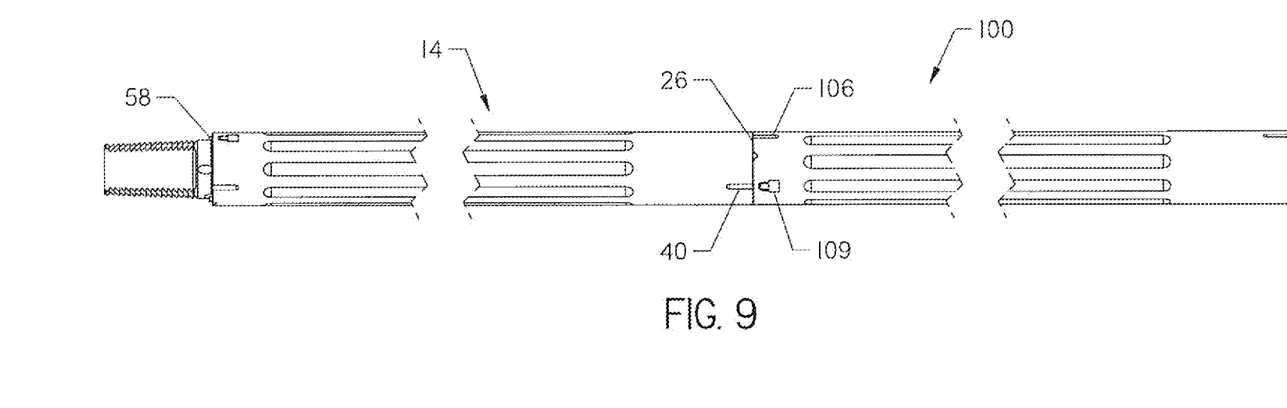
FIG. 9 is a side view of two rod sections connected and locked together

With reference now to FIG. 9, the second rod section 100 is rotated less than a full turn such that the box end alignment groove 40 is aligned with a lock symbol 109. Preferably, the second rod section 100 is rotated approximately a quarter turn. This alignment indicates the grooved section 42 (FIG. 3) of the box end 26 of the first rod section 14 has mated with the grooved portion 28 of the second rod section 100 and the rotation stop 32 has met the shoulder 48 (FIGS. 2 and 3). Further, the lock engagement mechanism 50 (FIG. 3) in the locked position will have its engagement points 58 (FIG. 3) within the lock engagement stop (FIG. 4) of rod section 14, rotationally locking the rod sections 14, 100 in both a counterclockwise and clockwise direction.

Figure 10:
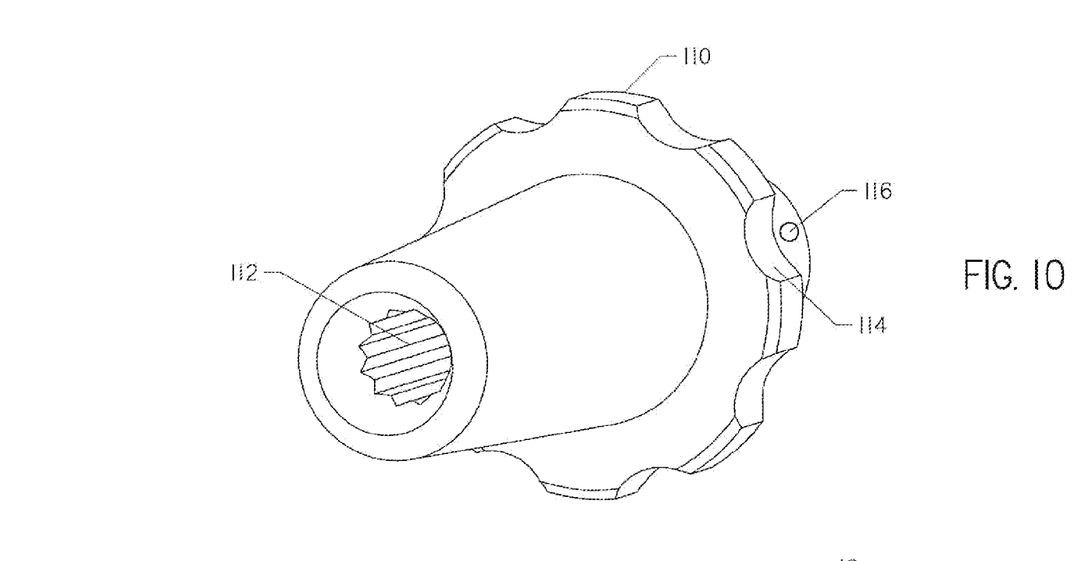
FIG. 10 is a perspective view of a key for use with the rod string of the present invention.

With reference now to FIG. 10, a key 110 is shown. The key 110 comprises an internal surface 112 and castellations 114. The internal surface 112 corresponds to the rod removal drive 56 (FIG. 3) of the lock engagement mechanism 50 (FIG. 3). The castellations 114 allow for increased surface contact for ease of rotating the key 110. An opening 116 may be provided to allow for high torque rotation of the key 110.

Figure 11:
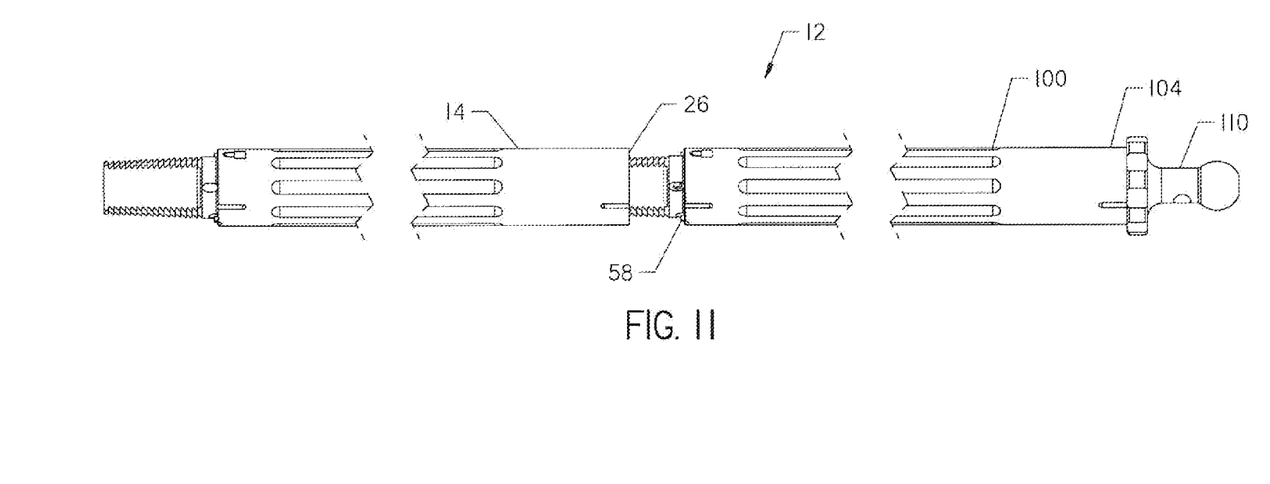
FIG. 11 is a side view of two rod sections being disconnected through use of the key of FIG. 10.

With reference to FIG. 11, insertion of the key 110 into the box end 104 of a rod section 100 and rotation of the key 110 causes the lock engagement mechanism 50 (FIG. 3) to go from the locked position to the unlocked position as described with reference to FIG. 5B above. This allows the lock engagement points 58 to retract from the lock engagement stop 49 (FIG. 4) located in the box end of pipe section 14, allowing for breakout of sections of the rod string 12.

Various modifications can be made in the design and operation of the present invention without departing from the spirit thereof. Thus, while the principal preferred construction and modes of operation of the invention have been explained in what is now considered to represent its best embodiments, which have been illustrated and described, it should be understood that the invention may be practiced otherwise than as specifically illustrated and described.

What is claimed is:

1. A lock engagement mechanism in a rod section, the lock engagement mechanism being movable between a first position and a second position, the rod section comprising a pin end and a box end, the lock engagement mechanism comprising:

a body located within the rod section;

spring rods located within the body, the spring rods comprising an engagement point located at an end of the spring rods, wherein the engagement point protrudes from the pin end when the lock engagement mechanism is in the second position, wherein the spring rods bias the lock engagement mechanism in the second position;
a removal drive rotationally connected to the spring rods for rotating the spring rods relative to the body;
cams located in an end of the body wherein the spring rods are movable within the cams.

2. The lock engagement mechanism of claim 1 wherein the engagement point contacts a box end of an adjacent rod section when in the second position.

3. The lock engagement mechanism of claim 2 wherein the box end of the adjacent rod section is locked to the rod section when the lock engagement mechanism is in the second position.

4. The lock engagement mechanism of claim 1 wherein the second position comprises a locked position and wherein the first position comprises an unlocked position.

5. A rod string comprising a plurality of rod sections, each of the plurality of rod sections comprising:
the lock engagement mechanism of claim 4;
a plurality of grooves and lands disposed on the pin end of the rod section;
a plurality of grooves and lands disposed in the box end of the rod section corresponding to the grooves and lands of the pin end at the second end of the body.

6. The rod string of claim 5 further comprising a release mechanism for moving the lock engagement mechanism from the locked to the unlocked position.

7. The rod string of claim 5 wherein the lock engagement mechanism is moved from the locked position to the unlocked position by inserting a key into the box end.

8. The rod string of claim 5 wherein the grooves and lands of the box end are discontinuous about the circumference of the pin end.

* * * * *